March 25, 1952 H. W. SCHAFFER 2,590,796
BRUSH MECHANISM
Filed March 17, 1951
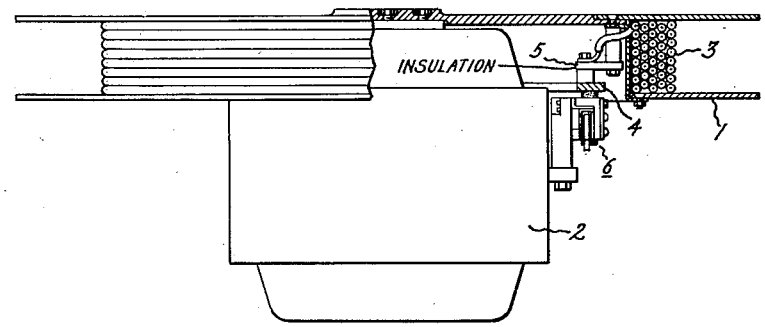
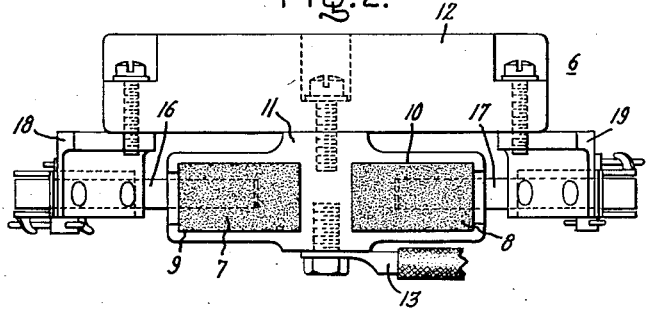
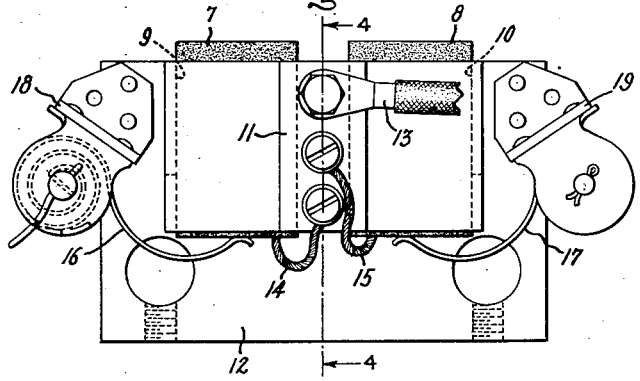
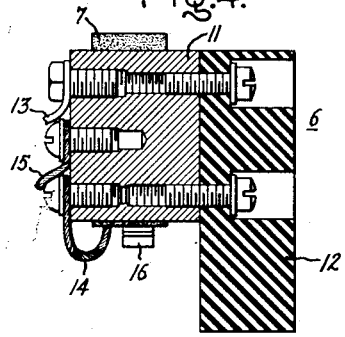
Inventor:
Herman W. Schaffer,
by Ernest C. Britton
His Attorney.

Patented Mar. 25, 1952

2,590,796

UNITED STATES PATENT OFFICE 2,590,796

BRUSH MECHANISM

Herman W. Schaffer, Erie, Pa., assignor to General Electric Company, a corporation of New York Application March 17, 1951, Serial No. 216,179

1 Claim. (Cl. 171—323)

1

This invention relates to brush mechanisms for use with dynamoelectric machines having rotatable current collectors, and more particularly to such brush mechanisms which employ spring means to bias the brushes against the current collectors.

Heretofore, various types of brush mechanisms have been employed in dynamoelectric machines to keep the brushes in firm contact with the current collectors, i. e., commutators or slip rings, and a number of these brush mechanisms have used spring means for that purpose. The brushes are ordinarily mounted in a passageway or slot in a brush holder or guide member, and spring means are mounted, as part of the brush mechanism, to bear upon the brushes and bias them against the current collector. The major objection to such a structure, however, is that the spring means are thereby electrically paralleled with the brush holder and thus carry a portion of the load current. This current flow through the spring means, of course, tends to heat up the springs and frequently it causes annealing of the spring metal. The annealing has the effect of lowering the spring tension and thus the brush pressure on the current collector. If the brush pressure becomes too low, excessive heating occurs at the surface of the current collector, and this heating often results in serious damage to the machine.

It is an object, therefore, of this invention to provide a new and improved brush mechanism in which the means for supplying the brush pressure are not affected by the current flow to the brushes.

It is another object of this invention to provide a new and improved brush mechanism in which no load current can flow through the spring means employed to supply the brush pressure.

The brush mechanism of this invention supports the brushes adjacent its associated collector means by means of an electrically conducting brush guide or holder member. This brush holder contains one or more passageways or slots which extend through it from one side to the other and in which the brushes are positioned. The brushes are not firmly secured in the passageways but are axially movable therein. The brush holder is itself mounted on a stationary supporting member formed of insulating material so that the passageways extend axially toward the current collector. Also mounted on the supporting member but separately from the brush holder are spring means for resiliently biasing the brushes into contact with the current

2 collector. In a preferred embodiment of this invention, the spring means contact the brushes at their ends remote from the current collector and thus apply forces to push the brushes against the current collector. Since the spring means are mounted separately on the supporting member from the brush holder, none of the current through the brushes can flow through the spring means. In other words, the supporting member forms an insulating barrier which prevents the spring means from carrying current in parallel with the brush holder.

For a better and more complete understanding of my invention, together with additional objects and advantages thereof, reference should now be had to the following description and accompanying drawing, in which Fig. 1 is a view, partially in section, of a conventional cable reel motor having mounted thereon a brush mechanism embodying this invention; Fig. 2 is an end elevation view of a brush mechanism similar to that of Fig. 1; Fig. 3 is a plan view of the brush mechanism of Fig. 2; and Fig. 4 is a cross-sectional view taken on the line 4—4 of Fig. 3.

In Fig. 1, there is illustrated a cable reel motor of the type customarily employed on mine locomotives which are energized through a long power supply cable. In such locomotives, the supply cable is customarily wound on a rotatable drum or reel mounted on the top of the locomotive, and the cable then unwinds from this drum as the locomotive moves along. Naturally, as the locomotive retraces its path, it is necessary to rewind the cable, and it is for that purpose that the cable reel motor is employed; i. e., it supplies the wind-up torque. In order to electrically connect the cable to the traction motors, as well as to the cable reel motor, a slip ring and brush structure is ordinarily employed.

More specifically, referring to the diagram, wound on the drum 1 of a conventional cable reel motor 2 are a plurality of turns of an electrical cable 3, one end of which is connected to the current collector or slip ring 4 and the remote end of which is connected to a source of electrical power (not shown). Slip ring 4 is secured to drum 1 by means of an insulating member 5 and rotates with the drum upon rotation of the shaft of motor 2. Positioned so that its brushes cooperate with slip ring 4 to be energized thereby is a stationary brush mechanism 6. Brush mechanism 6, a preferred embodiment of this invention, employs spring means to keep its brushes in firm contact with slip ring 4.

As may be more clearly seen by reference to

Fig. 2, the carbon brushes 7 and 8 carried by brush mechanism 6 are respectively positioned in the passageways 9 and 10 which extend through the electrically conducting brush guide or holder member 11. Brush holder 11 is mounted on a supporting member 12 formed of insulating material and is joined to its load circuit, such as, for example, the one or more traction motors of the associated locomotive, by means of the flexible lead 13. As is shown in Fig. 3, a firm electrical connection is provided between each of the brushes and the brush holder by means of a separate jumper, one end of which is buried in its associated brush and the other end of which is secured to the brush holder. Thus, brush 7 is connected to brush holder 11 by jumper 14 and brush 8 is connected thereto by jumper 15. Fig. 4, a cross section through 4—4 of Fig. 3, further illustrates these connections as well as showing a preferred method of assembling brush holder 11 to supporting member 12.

The pressures necessary to keep brushes 7 and 8 in contact with their associated current collector are supplied respectively by the spring members 16 and 17. Each of these spring members is mounted on a separate spring support, spring 16 being mounted on support 18 and spring 17 being mounted on support 19. Both spring supports are, in turn, mounted on supporting member 12 separately from brush holder 11 and neither contacts the brush holder at any point. Thus, even though springs 16 and 17 contact brushes 7 and 8, they do not form a parallel current path with brush holder 11 because of the insulating properties of supporting member 12. Therefore, none of the load or brush current flowing through lead 13 can flow through the spring members.

This, then, means that there is no heating of the spring members other than that caused by heat transferred to them from the brushes or brush holders as they heat up under load. The amount of heat transferred therefrom, however, is so small as to have a negligible effect on the physical properties of the spring members. Thus, there is secured the desired result that the current flow in the brush mechanism have little or no effect upon the spring tension and thereby little or no effect upon the brush pressure.

While there has been described what at present is considered to be the preferred embodiment of this invention, it will be obvious to those skilled in the art that various alterations and modifications may be made therein without departing from the invention and it is, therefore, aimed in the appended claim to cover all such changes and modifications as fall within the true spirit and scope of the invention.

What I claim as new and desire to secure by Letters Patent of the United States is:

In a dynamoelectric machine having a rotatable current collector, a brush holder assembly including a stationary supporting member of insulating material, an electrically conducting brush holder member provided with a passageway extending therethrough and mounted on said supporting member with said passageway extending axially toward said current collector, a brush disposed within said passageway and axially movable therein, said brush having a pigtail removably connected to said brush holder member a spring support mounted on said supporting member independently of said brush holder member, a spring for biasing said brush into contact with said current collector and mounted on said spring support to be insulated from said brush guide member to prevent current flow therebetween, and a terminal on said brush holder member for making an electrical connection thereto.

HERMAN W. SCHAFFER.

REFERENCES CITED

The following references are of record in the file of this patent:

UNITED STATES PATENTS

| Number | Name | Date |
|---|---|---|
| 1,275,458 | Meston | Aug. 13, 1918 |
| 1,415,577 | Knapp | May 9, 1922 |

FOREIGN PATENTS

| Number | Country | Date |
|---|---|---|
| 8,054 | Great Britain | of 1903 |
| 18,777 | Great Britain | of 1912 |